(No Model.)

M. D. CHIPLEY.
Corset Clasp.

No. 231,700. Patented Aug. 31, 1880.

WITNESSES:
Chas. M. Higgins
Jno. E. Gavin

INVENTOR:
Marshal D. Chipley
by S. A. Wallis
Atty.

UNITED STATES PATENT OFFICE.

MARSHAL D. CHIPLEY, OF NEW YORK, N. Y.

CORSET-CLASP.

SPECIFICATION forming part of Letters Patent No. 231,700, dated August 31, 1880.

Application filed June 23, 1880. (No model.)

*To all whom it may concern:*

Be it known that I, MARSHAL D. CHIPLEY, of New York city, have invented certain new and useful Improvements in Corset-Clasps, of which the following is a specification.

My invention aims to provide a corset-clasp which will be secure against accidental unclasping, which is a common defect with existing clasps; and my invention is mainly embodied in the form of the barb or engaging end of the hook of the clasp, whereby the eye, when moved or deflected by the contraction of the corset, becomes thrown away from the exit of the hook into the loop of the same, so as to prevent its disengagement from the hook, as hereinafter set forth.

Figure 1:
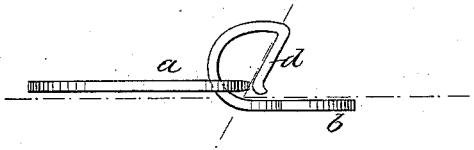
Figure 2:
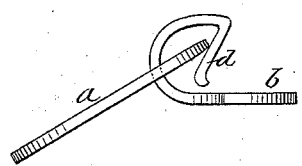
Figure 3:
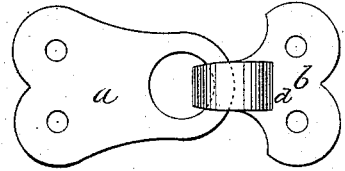

Figure 1 of the annexed drawings gives an edge view of my improved corset-clasp with the hook and eye thereof in parallel positions; and Fig. 2 is a similar view with the eye deflected into the loop of the hook. Fig. 3 is a plan view.

As may be observed from the drawings, my improved clasp is made, as usual, in two parts—an eye part, $a$, and hook part $b$—which engage with each other. The eyes and hooks are each riveted separately to steels or springs, as usual, which are fixed to the meeting-edges of the corsets, as will be readily understood, and, as may be readily inferred, the said eyes and hooks are preferably formed of sheet metal. The eye $a$ is of about the usual form, and its opening $c$ may be either round or elongated, in lieu of the key-hole form used with the common pin-hook clasp. The hook $b$, however, has a novel construction, in that its terminal part or barb, $d$, is prolonged till it closely approaches the base of the hook, leaving a narrow throat, just sufficient to enable the eye to enter or leave the loop of the hook when engaged or disengaged, while, furthermore, the barb is bent inward at an angle obtuse to the line of exit of the eye from the loop, as shown by dotted lines in Fig. 1.

It will hence be observed that by this construction of the hook the eye may be engaged therewith or disengaged therefrom by the intentional action of the hand in a very easy manner; but should any contractions of the corset take place, as they frequently do by certain movements of the body, the eye will then be forced against the barb of the hook, and, by reason of the inclination of this barb, will be deflected thereby into the loop of the hook and away from the exit, as seen in Fig. 2, thus effectually preventing accidental disengagement, which constitutes an important advantage of my improvement over previous clasps of this kind.

The extremity of the eye is preferably beveled, as seen in Figs. 1 and 2, so as to enter and leave the hook in a more easy yet tight-fitting manner, as may be readily understood.

What I claim as my invention is—

A corset-clasp hook having its barb or terminal part bent inward at an angle obtuse to the line of exit of the eye from the loop of the hook, whereby the tendency of the clasp or corset to contract throws the eye into the loop of the hook and away from the exit thereof, substantially as and for the purpose set forth.

MARSHAL D. CHIPLEY.

Witnesses:
EDWARD H. WALES,
JNO. E. GAVIN.